United States Patent
Ahn et al.

(10) Patent No.: US 9,166,668 B2
(45) Date of Patent: Oct. 20, 2015

(54) APPARATUS AND METHOD FOR ADDING BURST OF SINGLE-INPUT MULTIPLE-OUTPUT MODE OR COLLABORATIVE SPATIAL MULTIPLEXING MODE TO FRAME IN SPATIAL MULTIPLEXING SYSTEM

(75) Inventors: Byung-Chan Ahn, Seoul (KR); Seung-Joo Maeng, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 728 days.

(21) Appl. No.: 12/381,085

(22) Filed: Mar. 6, 2009

(65) Prior Publication Data

US 2009/0225783 A1 Sep. 10, 2009

(30) Foreign Application Priority Data

Mar. 6, 2008 (KR) .................. 10-2008-0021181

(51) Int. Cl.
*H04J 3/24* (2006.01)
*H04B 7/06* (2006.01)
*H04L 5/00* (2006.01)

(52) U.S. Cl.
CPC ............ *H04B 7/0697* (2013.01); *H04L 5/0048* (2013.01); *H04J 3/24* (2013.01); *H04L 5/0023* (2013.01)

(58) Field of Classification Search
CPC ........................................ H04J 3/04
USPC ........ 370/230, 396, 329–339, 342, 376–380, 370/491–497, 458–461, 500–545, 74, 98, 370/68; 455/450–460
See application file for complete search history.

(56) References Cited

U.S. PATENT DOCUMENTS

| | | | |
|---|---|---|---|
| 6,802,035 B2 * | 10/2004 | Catreux et al. ................ | 714/746 |
| 7,656,969 B2 * | 2/2010 | Strong .......................... | 375/316 |
| 2005/0286408 A1 | 12/2005 | Jin et al. | |
| 2006/0209754 A1 * | 9/2006 | Ji et al. ......................... | 370/329 |
| 2007/0105508 A1 * | 5/2007 | Tong et al. .................... | 455/101 |
| 2007/0195796 A1 * | 8/2007 | Ushiyama et al. ............ | 370/396 |
| 2008/0188232 A1 * | 8/2008 | Park et al. ..................... | 455/450 |
| 2011/0064036 A1 * | 3/2011 | Tsai et al. ..................... | 370/329 |

OTHER PUBLICATIONS

Korean Office Action dated Jan. 23, 2014 in connection with Korean Application No. 10-2008-0021181, 5 pages.

* cited by examiner

*Primary Examiner* — Iqbal Zaidi

(57) ABSTRACT

A system and method for adding a burst of a single-input multiple-output mode or collaborative spatial multiplexing mode to a frame in a spatial multiplexing system. A base station is configured to add a burst of a single-input multiple-output mode to a frame in a spatial multiplexing system. The system and method includes backing up a pilot pattern and a number of slots allocated for connections with terminals; releasing slots allocated for a burst; resetting a pilot pattern of a collaborative spatial multiplexing mode burst of the terminals: and recalculating the number of remaining slots; comparing the number of slots that can be additionally allocated to the single-input multiple-output mode with the number of slots released in the releasing step; and determining a transmission format.

30 Claims, 10 Drawing Sheets

APPARATUS AND METHOD FOR ADDING BURST OF SINGLE-INPUT MULTIPLE-OUTPUT MODE OR COLLABORATIVE SPATIAL MULTIPLEXING MODE TO FRAME IN SPATIAL MULTIPLEXING SYSTEM

CROSS-REFERENCE TO RELATED APPLICATION(S) AND CLAIM OF PRIORITY

The present application claims priority to an application entitled "Apparatus and Method for Adding Burst of Single-Input Multiple-Output Mode or Collaborative Spatial Multiplexing Mode to Frame in Spatial Multiplexing System" filed in the Korean Industrial Property Office on Mar. 6, 2008, and assigned Serial No. 10-2008-0021181, the contents of which are hereby incorporated by reference.

TECHNICAL FIELD OF THE INVENTION

The present invention relates to a spatial multiplexing system, and more particularly to an apparatus and method for adding a burst of a single-input multiple-output mode or collaborative spatial multiplexing mode to a frame in a spatial multiplexing system.

BACKGROUND OF THE INVENTION

In general, spatial multiplexing is a scheme for increasing the data rate through use of spatial diversity between divided transmission/reception antennas. In uplink, it is difficult to utilize transmit antenna diversity due to various restrictions. In order to solve such a problem, a Collaborative Spatial Multiplexing (C-SM) mode for obtaining an effect similar to that of the conventional transmit antenna diversity through use of collaboration between terminals is disclosed in IEEE 802.16. In the C-SM mode, when each of the two terminals has one transmission antenna, the two terminals are allocated the same frequency resource and transmit data at the same time. In such a C-SM mode, the two terminals output pilot signals through code multiplexing, wherein the two terminals can output two different data streams.

FIG. 1 is a view illustrating a pilot pattern when the general C-SM mode is used.

A first terminal using pilot pattern A and a second terminal using pilot pattern B share one tile (that means a resource unit having a predetermined size) with each other. The two terminals use pilot tones constituted by at least one pilot subcarrier on a division basis while sharing and using data tones constituted by at least one data subcarrier. Accordingly, although the data rate that one terminal can obtain does not change, the throughput increases from the viewpoint of a sector.

A significant characteristic of a method of allocating a burst to an uplink frame using the C-SM mode, as compared with using only a single-input multiple-output (SIMO) mode, is that an uplink burst is allocated for each layer using two pilot patterns. This characteristic is restricted when a terminal cannot use both pilot patterns of one slot, when a terminal cannot use one slot in the SIMO mode and the C-SM mode at the same time, and when a terminal uses only the SIMO mode from necessity.

According to IEEE 802.16, methods for allocating a C-SM burst to a frame are roughly classified into two methods.

The first method is to allocate a burst using pilot pattern A and a burst using pilot pattern B to both sides through use of a Multiple-Input-Multiple-Output Uplink Basic Information Element (MIMO UL Basic IE). This method has disadvantages in that a part of the slots is wasted because of the a difference in size between the burst using pilot pattern A and the burst using pilot pattern B, and it is not easy to make both sides effective.

The second method is to separately allocate a burst using pilot pattern A and a burst using pilot pattern B one by one through use of a UL H-ARQ Chase Sub-Burst information element.

Of these methods, particularly, a method for allocating an uplink burst through use of the C-SM mode requires two functions.

First, in order to maintain efficient Rise-over-Thermal (RoT) at a predetermined level, an interference control function of controlling a rate of slots using the C-SM mode to be proper is required. Generally, with respect to the same number of slots, using the slots in the C-SM mode causes greater interference to neighboring cells than using the slots in the SIMO mode. For this reason, one pilot pattern may be used in the same manner as when only the SIMO mode is used, while the other pilot pattern is used only when a specific condition is satisfied. According to the conventional method, an additional pilot pattern is used only for terminals very near to the base station so as to minimize the increase in the efficient RoT as much as possible. In this case, a part of the slots may use one pilot pattern while the other slots use both pilot patterns. The slots using both pilot patterns require greater uplink transmission power than the slots using only one pilot pattern. Meanwhile, with respect to a terminal located in the boundary of a cell, it may be necessary to prevent the terminal from using both pilot patterns in order to ensure coverage. According to the conventional method, since it is not easy to control a specific burst to use one pilot pattern, a separate consideration is required in order to complement the coverage problem. A simple solution to prevent a terminal located in a cell boundary from using both pilot patterns is to make the terminal use the SIMO mode. Since interference is influenced by the conditions for use with the SIMO mode, the conventional interference control scheme needs to be modified.

Second, it must be possible to efficiently add a burst with a specific size. Even in the case of using only the C-SM mode, a newly selected current burst may, or may not, be added according to the disposed position of a pre-allocated burst. Such a result is very undesirable when the newly selected burst includes a connection having relay-related Quality-of-Service (QoS) requirements. In order to avoid such a problem, a function of rearranging the disposition of the pre-allocated burst before the newly selected burst is added to a frame is required. In addition, when the SIMO mode is used together with the C-SM mode, the problem becomes more complex. A burst including a connection selected according to the scheduling priorities may use the SIMO mode or the C-SM mode. That is, bursts using the SIMO mode and bursts using the C-SM mode are alternately selected. However, since a scheme of disposing a pre-allocated burst in order to add a burst using the SIMO mode is different from a scheme of disposing a pre-allocated burst in order to add a burst using the C-SM mode, it is necessary to develop supplementary technology for adding the bursts.

SUMMARY OF THE INVENTION

To address the above-discussed deficiencies of the prior art, it is a primary object to provide a method for selecting, by a base station, a single-input multiple-output mode or a collaborative spatial multiplexing mode in a spatial multiplexing system.

Also, the present invention provides a method for adding, by a base station, a burst of a single-input multiple-output mode to a frame in a spatial multiplexing system.

In addition, the present invention provides a method for adding, by a base station, a burst of a collaborative spatial multiplexing mode to a frame in a spatial multiplexing system.

In accordance with an aspect of the present invention, there is provided a method for adding, by a base station, a burst of a single-input multiple-output mode in a spatial multiplexing system. The method including the steps of backing up a pilot pattern and the number of slots allocated for connections with terminals and releasing slots allocated for a burst; resetting a pilot pattern of a collaborative spatial multiplexing mode burst of the terminals and recalculating the number of remaining slots; comparing the number of slots that can be additionally allocated to the single-input multiple-output mode with the number of slots released in the releasing step when bursts for which the pilot pattern has not been determined do not remain; and determining a transmission format to be in the single-input multiple-output mode when the number of slots that can be additionally allocated to the single-input multiple-output mode is not less than the number of slots released in the releasing step.

In accordance with another aspect of the present invention, there is provided a method for adding, by a base station, a burst of a collaborative spatial multiplexing mode to a frame in a spatial multiplexing system. The method includes the steps of backing up a pilot pattern and the number of slots allocated for connections with terminals and releasing slots allocated for a burst; resetting a pilot pattern of a collaborative spatial multiplexing mode burst of the terminals and recalculating the number of remaining slots; comparing the number of slots that can be additionally allocated to pilot pattern B of the collaborative spatial multiplexing mode with the number of slots released in the releasing step when bursts for which the pilot pattern has not been determined do not remain; and determining a transmission format to be in the collaborative spatial multiplexing mode, when the number of slots that can be additionally allocated to pilot pattern B of the collaborative spatial multiplexing mode is not less than the number of slots released in the releasing step.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

The following description of the present invention will be given about a method for allocating an uplink burst to a frame through use of a C-SM mode according to the present invention. The method for allocating an uplink burst to a frame through use of the C-SM mode is divided into a part for determining a SIMO mode or the C-SM mode for a selected burst, a part for adding a burst of the SIMO mode to a frame, and a part for adding a burst of the C-SM mode to a frame.

Figure 1:
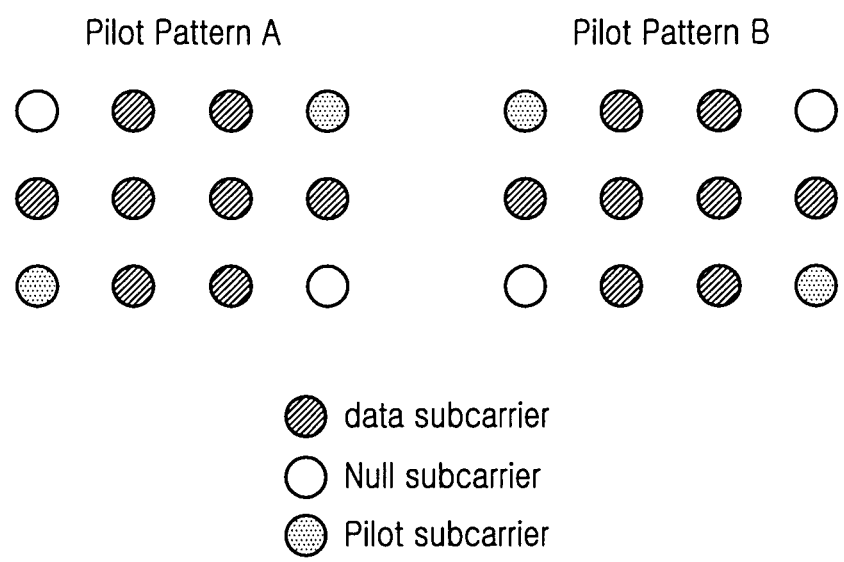
FIG. 1 is a view illustrating a pilot pattern when the general C-SM mode is used.
Figure 2:
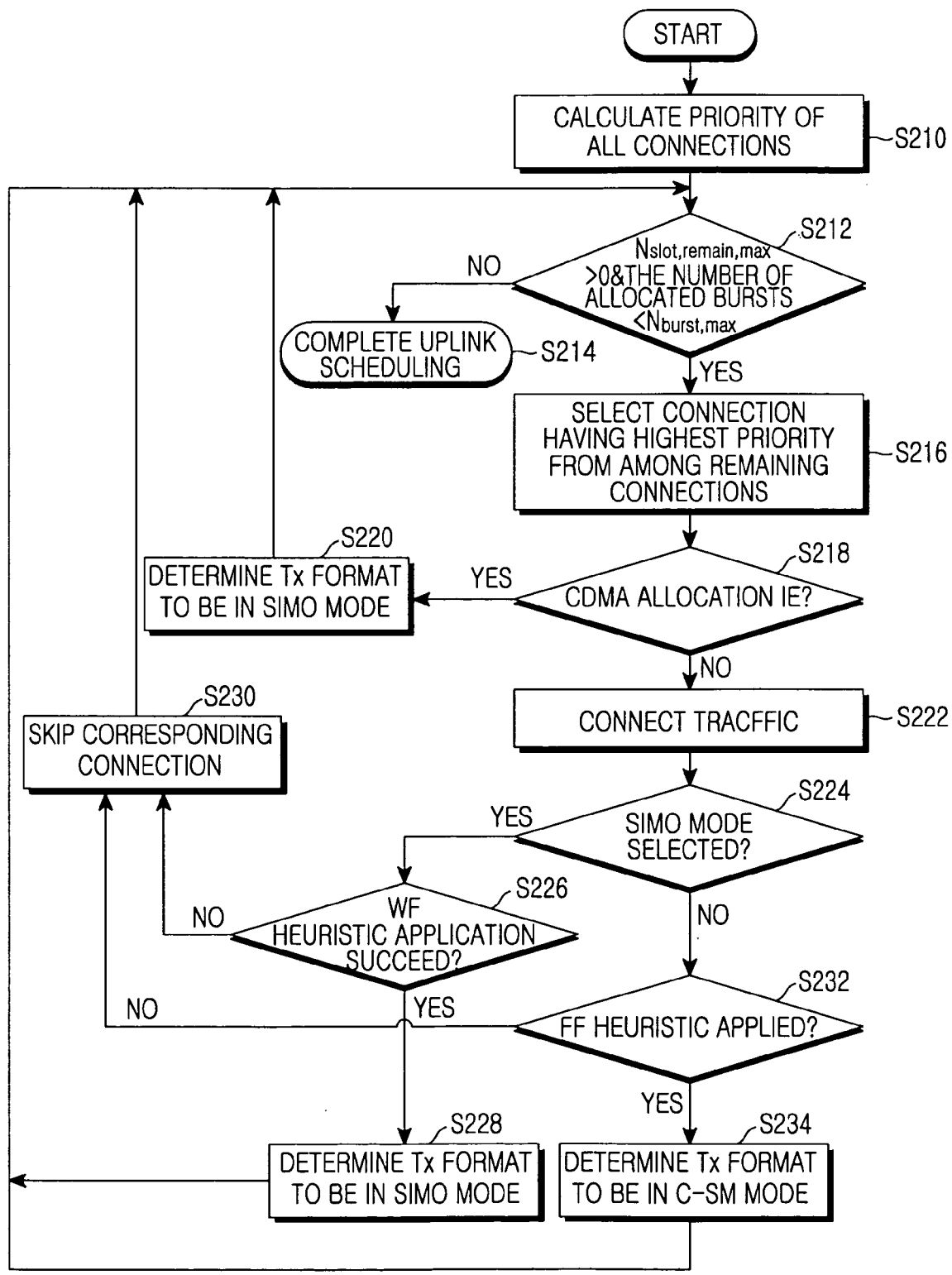
FIG. 2 is a flowchart illustrating an uplink scheduling and uplink burst allocating algorithm according to an exemplary embodiment of the present invention.

FIG. 2 is a flowchart illustrating an uplink scheduling and uplink burst allocating algorithm according to an exemplary embodiment of the present invention.

Hereinafter, the uplink scheduling and uplink burst allocating-algorithm according to an exemplary embodiment of the present invention will be described in detail with reference to FIG. 2. More particularly, the following description will be given about an operation for determining a transmission format of a burst according to a selected mode.

A base station calculates priorities of connections with a plurality of terminals in step 210, and proceeds to step 212. In step 212, when the maximum value "max($N_{slot, remain, SIMO}$, $N_{slot, remain, A}$, $N_{slot, remain, B}$)=$N_{slot,remain,max}$" among the number "$N_{slot, remain, SIMO}$" of slots that can be additionally allocated to the SIMO mode, the number "$N_{slot, remain, A}$" of slots that can be additionally allocated to pilot pattern A of the C-SM mode, and the number "$N_{slot, remain, B}$" of slots that can be additionally allocated to pilot pattern B of the C-SM mode are greater than zero, and when the number of allocated bursts is less than the maximum number of bursts "$N_{burst, max}$," the base station proceeds to step 216.

In step 216, the base station selects a connection having the highest priority from among the remaining connections. In step 218, the base station determines if a burst of the connection selected in step 216 corresponds to a CDMA allocation information element. When the burst of the selected connection corresponds to a CDMA allocation information element, the base station proceeds to step 220 where the base station determines the SIMO-mode-based transmission format for the burst of the selected connection. In contrast, when it is determined that the burst of the selected connection does not correspond to a CDMA allocation information element in step 218, the base station establishes the selected connection to be used for the transmission of traffic to a terminal and proceeds to step 224.

In step 224, the base station determines if the selected mode corresponds to the SIMO mode. When the selected mode corresponds to the SIMO mode, the base station proceeds to step 226 where the base station applies a Worst Fit (WF) heuristic for selecting a pilot pattern of the SIMO mode. In contrast, when the selected mode does not correspond to the SIMO mode, the base station proceeds to step 232 where the base station applies an First Fit (FF) heuristic for selecting a pilot pattern of the C-SM mode. When a pilot pattern is successfully selected as a result of the application of the WF heuristic in step 226, the base station proceeds to step 228 where the base station determines the transmission format to be in the SIMO mode. In contrast, if the base station fails to select a pilot pattern as a result of the application of the WF heuristic in step 226, the base station proceeds to step 230 where the base station determines the previously backed-up transmission format to be used for the selected connection and skips the selected connection. Meanwhile, when a pilot pattern is successfully selected as a result of the application of the FF heuristic in step 232, the base station proceeds to step 234 where the base station determines the transmission format to be in the C-SM mode. In contrast, if the base station fails to select a pilot pattern as a result of the application of the FF heuristic in step 232, the base station proceeds to step 230 where the base station determines the previously backed-up transmission format to be used for the connection selected in step 216 and skips the selected connection.

Detailed operations of the WF heuristic and FF heuristic will be described later with reference to FIGS. 6 and 8.

Figure 3:
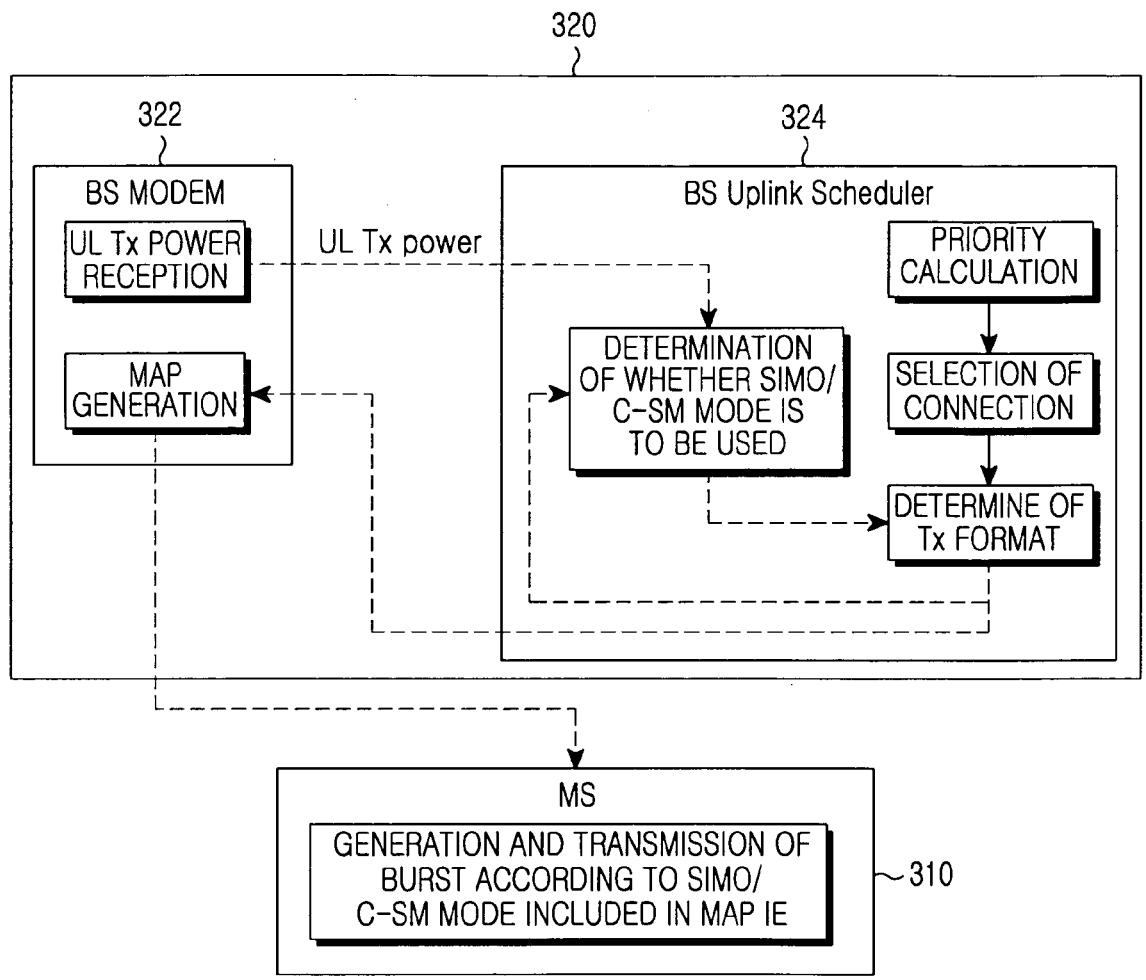
FIG. 3 is a block diagram illustrating the configuration of a system for determining the SIMO mode or the C-SM mode for a selected burst according to an exemplary embodiment of the present invention.

FIG. 3 is a block diagram illustrating the configuration of a system for selecting the SIMO mode or the C-SM mode for a selected burst according to an exemplary embodiment of the present invention.

The system for selecting the SIMO mode or the C-SM mode for a selected burst according to an exemplary embodiment of the present invention includes a base station 320 and a terminal 310, wherein the base station 320 includes a modem 322 and an uplink scheduler 324. When the modem 322 of the base station receives uplink transmission power from the terminal, the modem 322 takes the average of the received uplink transmission power and transmits the average to the uplink scheduler 324. The uplink scheduler 324 determines whether to use the SIMO mode or the C-SM mode according to the average, and determines a transmission format according to an MCS level by performing the procedure described with reference to FIG. 2. When the transmission format has been determined, the uplink scheduler 324 transmits the determined transmission format to the modem 322, and the modem 322 creates MAP information expressing a burst position. In addition, the MAP information includes information representing the transmission format, and SIMO mode or C-SM mode information, as well. Thereafter, the base station 320 transmits the MAP information to the terminal 310. The terminal 310 generates a burst according to the transmission format information and SIMO mode or C-SM mode information that are included in the MAP information received from the base station 320. The terminal 310 transmits the generated burst to the base station 320.

Figure 4:
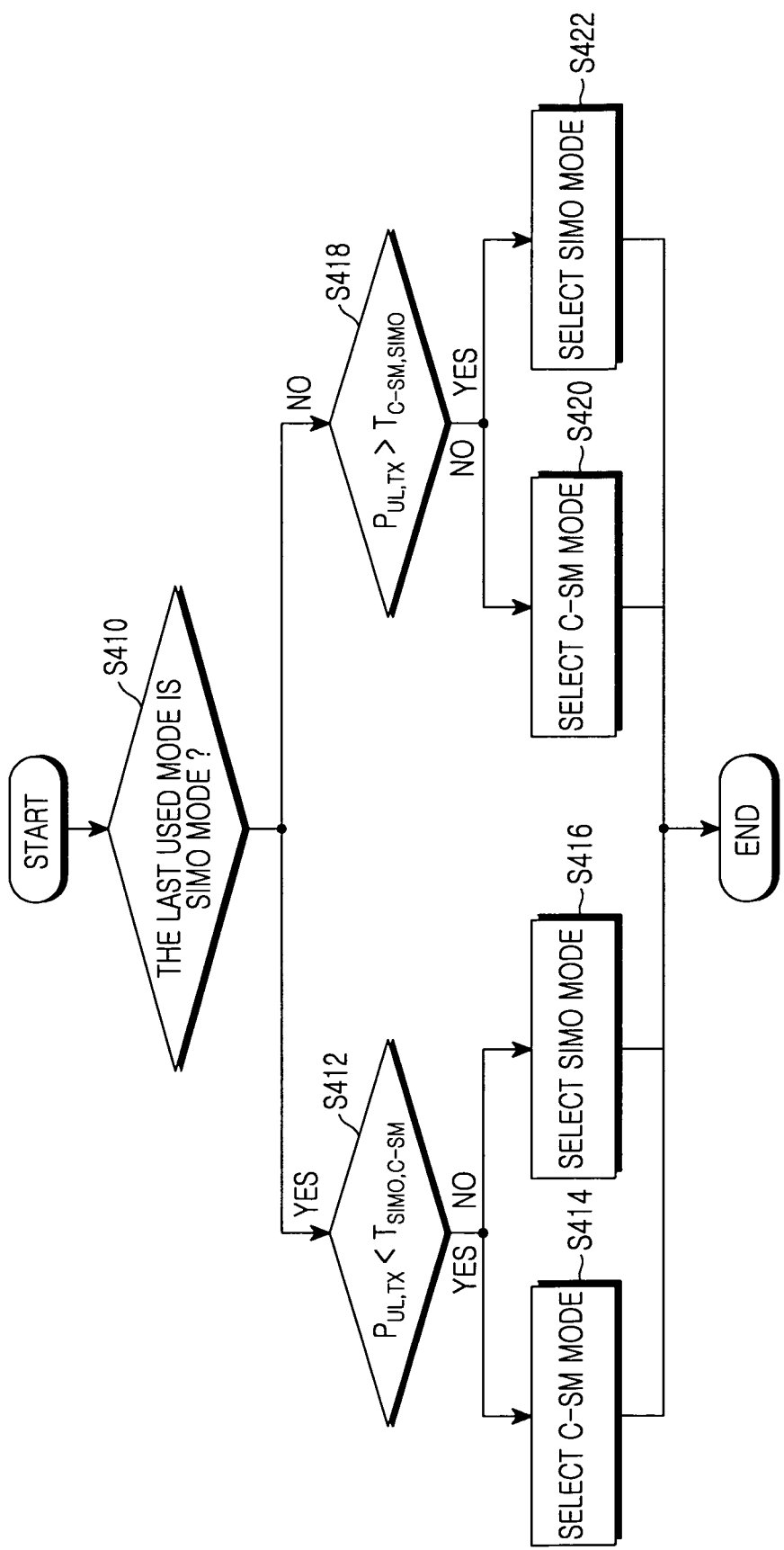
FIG. 4 is a flowchart illustrating a method for determining the SIMO mode or C-SM mode for a selected burst according to an exemplary embodiment of the present invention.

FIG. 4 is a flowchart illustrating a method for determining the SIMO mode or C-SM mode for a selected burst according to an exemplary embodiment of the present invention.

A base station transmits a burst in either the SIMO mode or the C-SM mode by taking into consideration the type of data to transmit and the channel state.

Selecting the SIMO mode or the C-SM mode is performed through use of an average value that is obtained by normalizing uplink transmission power "$P_{UL, TX}$" that is received from a terminal based on uplink transmission power of a non-HARQ burst with QPSK ½. Before allocating an uplink burst to a frame, the base station predetermines which mode of the SIMO and C-SM modes is to be used. Basically, after a specific threshold value has been set, the terminal having a normalized uplink transmission power "$P_{UL, TX}$" higher than the specific threshold value is established to use the SIMO mode, while a terminal having a normalized uplink transmission power "$P_{UL, TX}$" equal to or less than the specific threshold value is established to use the C-SM mode. Since a terminal located in a boundary area has a high path loss, the terminal has high normalized uplink power so that the terminal comes to use the SIMO mode. Also, the normalized uplink transmission power threshold value for dividing into the SIMO mode and the C-SM mode is determined by taking capacity and coverage into consideration. When the normalized uplink transmission power threshold value is set to a large value, most terminals come to use the SIMO mode, and thus, the frequency of the utilization of the C-SM mode becomes low so that the capacity is reduced. Meanwhile, when the normalized uplink transmission power threshold value is set to a small value, interference to neighboring cells increases so that a coverage problem is created. In order to prevent unnecessary changes to the SIMO mode or the C-SM mode from occurring, a hysteresis margin is used when changing from the SIMO mode to the C-SM mode. That is, a threshold value "$T_{SIMO, C-SM}$" used when changing from the SIMO mode to the C-SM mode and a threshold value "$T_{C-SM, SIMO}$" used when changing from the C-SM mode to the SIMO mode are set to mutually different values.

Hereinafter, a method for determining the SIMO mode or C-SM mode for a selected burst according to an exemplary embodiment of the present invention will be described in detail with reference to FIG. 4.

In step 410, a base station checks if a last mode used by a terminal is the SIMO mode. When the last mode used by the terminal is the SIMO mode as a result of the check, the base station proceeds to step 412. In step 412, when uplink transmission power "$P_{UL, TX}$" transmitted from the terminal is less than a first threshold value "$T_{SIMO, C-SM}$" used as a criterion for changing from the SIMO mode to the C-SM mode, the base station proceeds to step 414, where the base station establishes the C-SM mode for the terminal. The uplink transmission power is a normalized average value. In contrast, when the uplink transmission power transmitted from the terminal is not less than the first threshold value used as a criterion for changing from the SIMO mode to the C-SM mode, the base station proceeds to step 416, where the base station establishes the SIMO mode.

Meanwhile, when the last mode used by the terminal is not the SIMO mode as a result of the check in step 410, the base station proceeds to step 418. In step 418, when the uplink transmission power is less than a second threshold value "$T_{C\text{-}SM,\,SIMO}$," the base station proceeds to step 420 where the base station establishes the C-SM mode for the terminal. In contrast, when the uplink transmission power is not less than the second threshold value in step 418, the base station proceeds to step 420 where the base station establishes the SIMO mode for the terminal.

A part for adding a SIMO burst to a frame determines if a selected burst can be allocated to the SIMO mode by newly determining the disposition of a pre-allocated burst.

Minimizing the number of slots allocated to the C-SM mode is maximizing the number of slots that can be allocated to the SIMO mode. Therefore, in order for the number of slots using one-side pilot pattern to be similar to the number of slots using the other-side pilot pattern, pre-allocated C-SM bursts are evenly divided and allocated to a layer using pilot pattern A and a layer using pilot pattern B. Accordingly, in consideration of the complexity in implementation, a WF heuristic is used.

The methods of applying the WF heuristic are as follows.

A first method is to arrange all pre-allocated C-SM bursts according to the number of slots. That is, since the first method is to add one burst, to decide a sequence, and to determine a pilot pattern whenever the need arises, a separate operation for arrangement is not required.

A second method is to determine pilot patterns in the sequence from a burst allocated the most slots to a burst allocated the fewest slots. When a pilot pattern of a certain burst belonging to a terminal is to be determined and a pilot pattern of another burst belonging to the terminal has already been determined, the certain burst is established to use the same pilot pattern as the another pattern. A pilot pattern of a first burst is determined by the WF heuristic. That is, if the number of slots determined for pilot pattern A is relatively greater, the burst is determined to have pilot pattern B, and if not, the burst is determined to have pilot pattern A. When the number of slots determined for pilot pattern A is equal to the number of slots determined for pilot pattern B, the burst is determined to have pilot pattern A.

Figure 5:
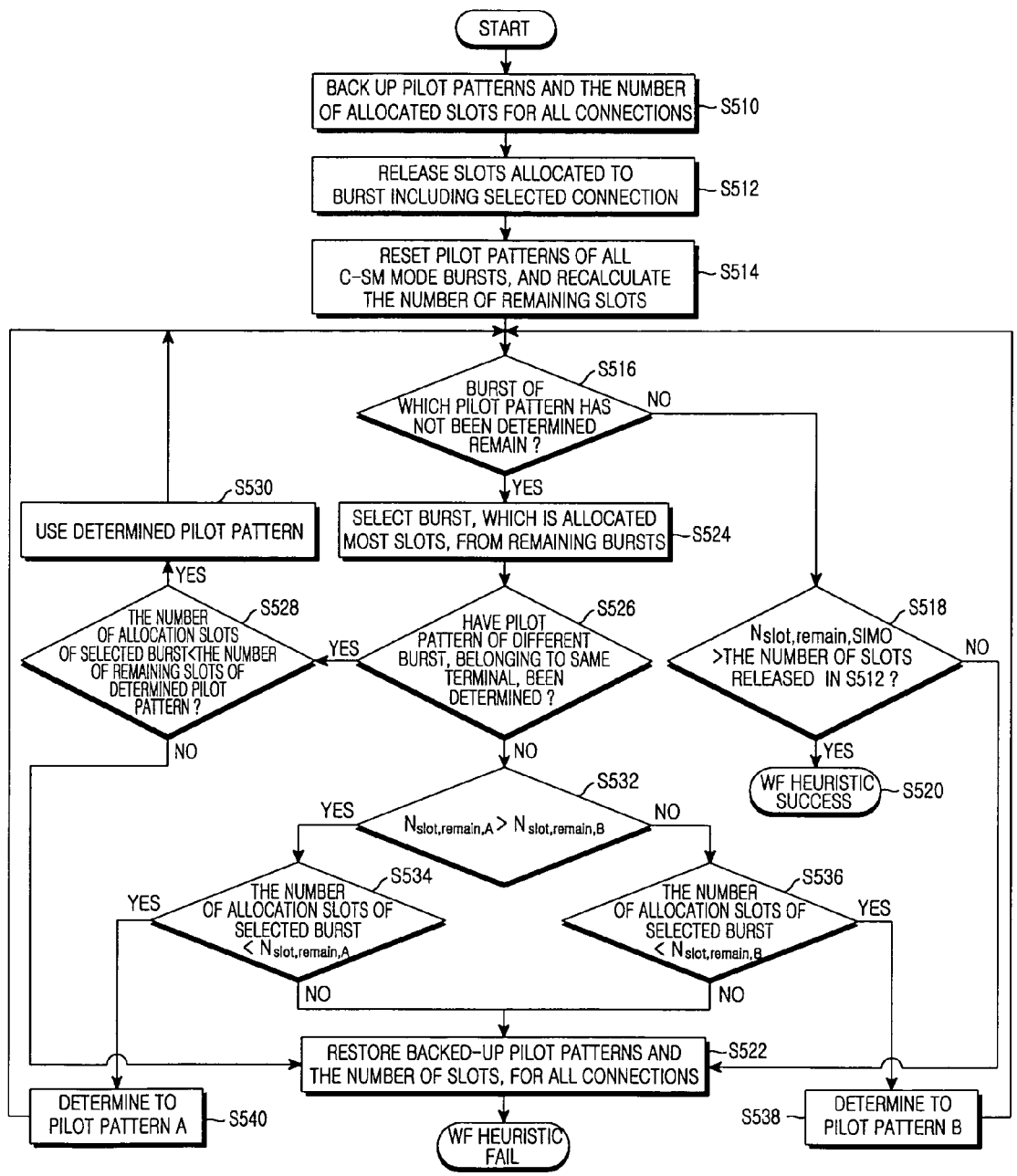
FIG. 5 is a flowchart illustrating a method for adding an SIMO mode burst according to an exemplary embodiment of the present invention.

Hereinafter, a method for adding a SIMO burst to a frame according to an exemplary embodiment of the present invention will be described in detail with reference to FIG. 5.

In step 510, an uplink scheduler backs up the pilot patterns and the number of slots allocated for every connection relating to a plurality of terminals. The base station releases slots allocated to bursts including selective connections with the terminals in step 512 and proceeds to step 514 where the base station resets pilot patterns of all C-SM bursts and then recalculates the number of remaining slots.

In step 516, if pilot patterns of every burst have been determined, the base station proceeds to step 518, and if not, the base station proceeds to step 524. When it is determined, in step 518, that the number "$N_{slot,\,remain,\,SIMO}$" of slots that can be additionally allocated to the SIMO mode is not less than the number of released slots, the base station determines that the WF heuristic has been performed successfully in step 520. In contrast, when it is determined, in step 518, that the number "$N_{slot,\,remain,\,SIMO}$" of slots that can be additionally allocated to the SIMO mode is less than the number of slots released in step 512, the base station proceeds to step 522 where the base station restores the number of slots and the pilot patterns, which have been backed up, for every connection with the plurality of terminals. When one or more bursts for which a pilot pattern has not been determined remain in step 516, the base station proceeds to step 524 where the base station selects a burst allocated the most slots from among the remaining bursts. Next, in step 526, when a pilot pattern of another burst belonging to a terminal, to which the selected burst belongs, has already been determined, the base station proceeds to step 528 where the base station determines if the number of allocation slots of the selected burst is less than the number of remaining slots of the determined pilot pattern. When the number of allocation slots of the selected burst is less than the number of remaining slots of the determined pilot pattern, the base station proceeds to step 530 where the determined pilot pattern identified in step 526 is used for the selected burst. In contrast, when it is determined, in step 528, that the number of allocation slots of the selected burst is not less than the number of remaining slots of the determined pilot pattern identified in step 526, the base station proceeds to step 522 where the base station restores the pilot patterns and the number of slots, which have been backed up, for every connection with the plurality of terminals.

Meanwhile, when it is determined in step 526 that a pilot pattern of another burst (i.e., a burst in step 512) belonging to the terminal has not yet been determined, and when it is determined, in step 532, that the number "$N_{slot,\,remain,\,A}$" of slots that can be additionally allocated to pilot pattern A of the C-SM mode is not less than the number "$N_{slot,\,remain,\,B}$" of slots that can be additionally allocated to pilot pattern B of the C-SM mode, the base station proceeds to step 534 where the base station compares the number of allocation slots of the selected burst with the number of slots that can be additionally allocated to pilot pattern A of the C-SM mode. When the number of allocation slots of the selected burst is less than the number of slots that can be additionally allocated to pilot pattern A of the C-SM mode as a result of the comparison in step 534, the base station proceeds to step 540 where pilot pattern A is determined.

When it is determined, in step 536, that the number of allocation slots of the selected burst in step 512 is less than the number of slots that can be additionally allocated to pilot pattern B of the C-SM mode, the base station proceeds to step 538 where pilot pattern B is determined. In contrast, when it is determined, in step 534, that the number of allocation slots of the selected burst in step 512 is greater than the number of slots that can be additionally allocated to pilot pattern A of the C-SM mode, or when it is determined, in step 536, that the number of allocation slots of the selected burst is not less than the number of slots that can be additionally allocated to pilot pattern B of the C-SM mode, the base station proceeds to step 522 where the base station restores the pilot patterns and the number of slots, which have been backed up, for every connection with the plurality of terminals.

Figure 6:
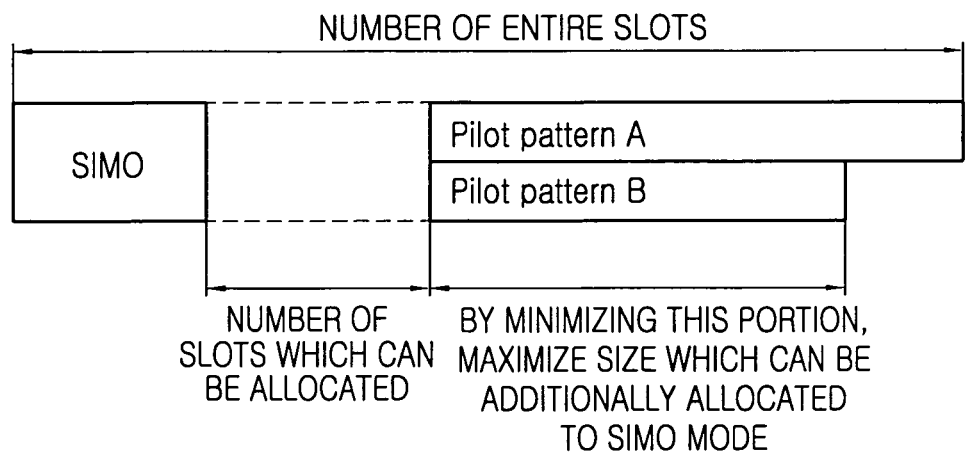
FIG. 6 is a view showing an example of a WF heuristic according to an exemplary embodiment of the present invention.

FIG. 6 is a view explaining the selection of pilot patterns based on a WF heuristic algorithm according to an exemplary embodiment of the present invention.

According to the WF heuristic algorithm, all the slots are divided into slots of the SIMO mode, slots of pilot patterns, and the remaining slots that can be allocated. When the number of slots used for the pilot patterns are minimized, the number of remaining slots that can be additionally allocated to the SIMO mode becomes maximized.

The part of adding a C-SM burst to a frame newly determines the disposition of a pre-allocated burst, thereby checking if a selected burst can be allocated to the C-SM mode. If the selected burst can be allocated to the C-SM mode as a result of the check, the selected burst is determined to be allocated to the C-SM mode; and if not, the selected burst is not allocated.

When as many as possible of the remaining slots, except for slots allocated to the SIMO mode, are used, and simultaneously, the pilot patterns of pre-allocated C-SM bursts are determined to be gathered into one layer as much as possible, the number of slots that can be additionally allocated to the C-SM mode becomes maximized. Therefore, pre-allocated C-SM bursts are divided and allocated to a layer using pilot pattern A and a layer using pilot pattern B so that the number of slots using pilot pattern A is greater than the number of slots using pilot pattern B. Accordingly, in consideration of the complexity in implementation, the FF heuristic is used.

The method of applying the FF heuristic is as follows.

A first method is to arrange all pre-allocated C-SM bursts according to the number of slots. In this case, since one burst is added whenever the need arises, and a sequence is determined, a separate operation for arrangement is not required. When a slot allocation for a selected connection is added to a pre-allocated burst, the arrangement is performed with the exception of the pre-allocated burst.

A second method is to determine pilot patterns in the sequence from a burst allocated the most slots to a burst allocated the fewest slots. A burst belonging to the same terminal as a burst, of which a pilot pattern is to be determined, is established to use pilot pattern B. In addition, when a pilot pattern of a certain burst belonging to a terminal is to be determined, and a pilot pattern of another burst belonging to the terminal has already been determined, the certain burst is established to use the same pilot pattern as the another pattern. In the other cases, if a space where pilot pattern A can be used remains, pilot pattern A is determined, and if not, pilot pattern B is determined.

A pilot pattern of a burst to be allocated changes whenever a new connection is selected. The pilot pattern of the burst is finally determined after all connection selections have been completed. That is, during a scheduling process, only a temporary pilot pattern of a burst is determined and changes every time in the direction of increasing the probability of selecting a new connection is as high as possible. This is because it is preferred that pre-allocated bursts are evenly divided into two-side layers when a connection to be next selected uses the SIMO mode and it is performed such that the bursts are gathered into one-side layer so as to empty the other-side layer as much as possible when a connection to be next selected uses the C-SM mode. It should be noted that one terminal must not simultaneously use pilot pattern A and pilot pattern B of one slot. To this end, one terminal is allowed to use only one of pilot pattern A and pilot pattern B in one frame. According to the standard, one terminal may use pilot pattern A and pilot pattern B for differently positioned slots, respectively, but it is allocated to use only one pattern in consideration of the complexity.

Figure 7:
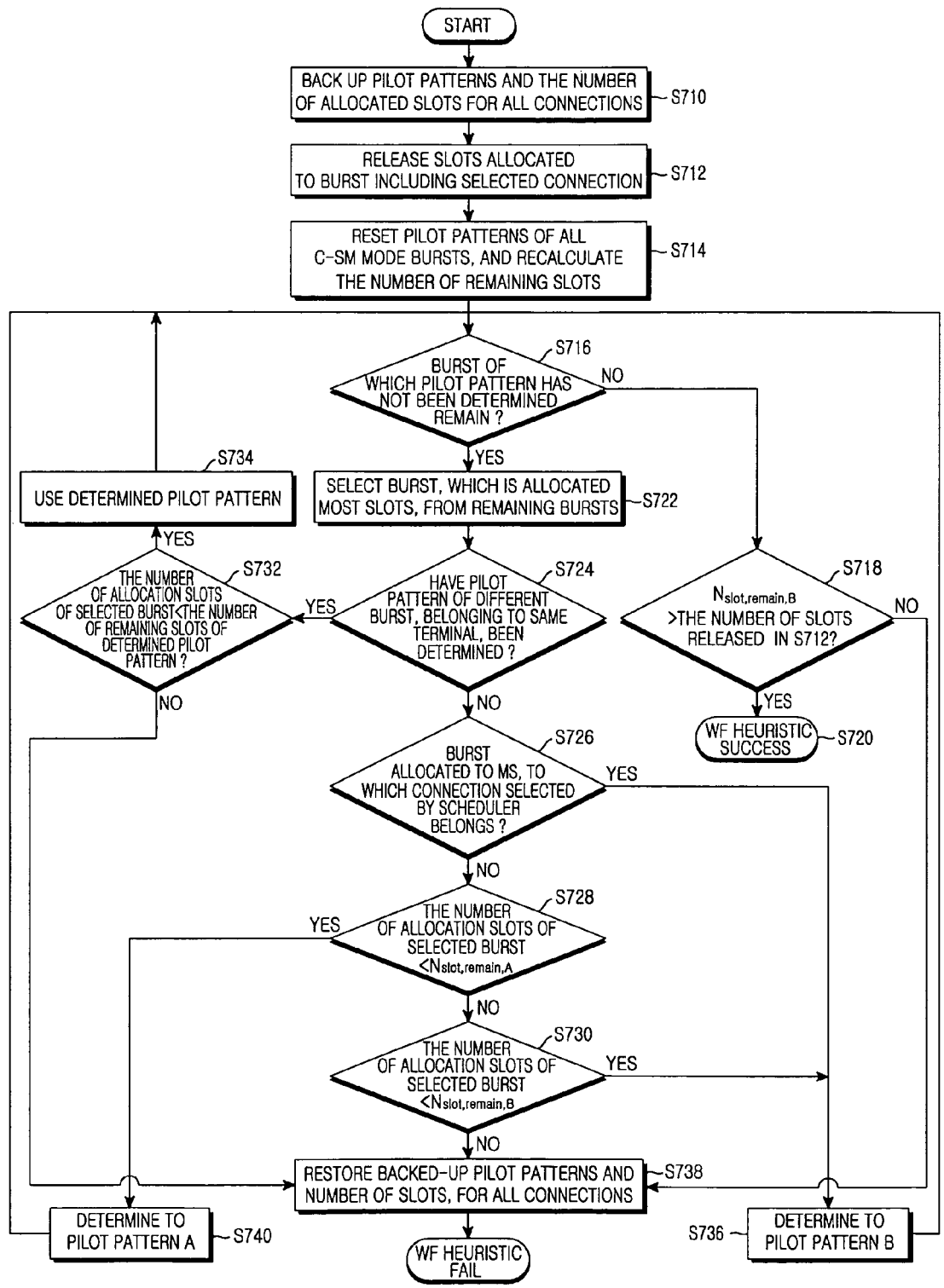
FIG. 7 is a flowchart illustrating a method for adding a C-SM mode burst according to an exemplary embodiment of the present invention.

Hereinafter, a method for adding a C-SM burst to a frame according to an exemplary embodiment of the present invention will be described in detail with reference to FIG. 7.

In step 710, an uplink scheduler backs up the pilot patterns and the number of slots allocated for every connection. The base station releases slots allocated to a burst, which is to include a selected connection with a terminal, in step 712. The base station proceeds to step 714 where the base station resets pilot patterns of all C-SM bursts and recalculates the number of remaining slots.

In step 716, if pilot patterns of all bursts have been determined, the base station proceeds to step 718, and if not, the base station proceeds to step 722. When it is determined, in step 718, that no burst of which a pilot pattern has not been determined remains and the number of slots that can be additionally allocated to pilot pattern B of the C-SM mode is not less than the number of slots released in step 712, the base station determines that the FF heuristic has been successfully performed in step 720. In contrast, when it is determined in step 718 that the number "$N_{slot, remain, B}$" of slots that can be additionally allocated to pilot pattern B of the C-SM mode is less than the number of slots released in step 712, the base station proceeds to step 738, where the base station restores the number of slots and the pilot patterns, which have been backed up, for every connection with a plurality of terminals. Meanwhile, when one or more bursts for which a pilot pattern has not been determined remain in step 716, the base station proceeds to step 722 where the base station selects a burst allocated the most slots from among the remaining bursts. Next, in step 724, when a pilot pattern of another burst belonging to a terminal, to which the selected burst belongs, has already been determined, the base station proceeds to step 732 where the base station determines if the number of allocation slots of the selected burst is less than the number of remaining slots of the determined pilot pattern. When the number of allocation slots of the selected burst is less than the number of remaining slots of the determined pilot pattern, the base station proceeds to step 734 where the determined pilot pattern is used for the selected burst. In contrast, when it is determined in step 732 that the number of allocation slots of the selected burst is not less than the number of remaining slots of the determined pilot pattern, the base station proceeds to step 738 where the base station restores the pilot patterns and the number of slots, which have been backed up, for every connection with the plurality of terminals.

Meanwhile, when it is determined, in step 724, that a pilot pattern of another burst belonging to the terminal has not yet been determined and when it is determined, in step 726, that there is no burst allocated to the terminal, to which a connection selected by the scheduler belongs, the base station proceeds to step 728. When the number of allocation slots of the selected burst is less than the number "$N_{slot, remain, A}$" of slots that can be additionally allocated to pilot pattern A of the C-SM mode, the base station proceeds to step 740 where pilot pattern A is determined.

When it is determined in step 730 that the number of allocation slots of the selected burst is less than the number of slots that can be additionally allocated to pilot pattern B of the C-SM mode, the base station proceeds to step 736 where pilot pattern B is determined. In contrast, when it is determined in step 730 that the number of allocation slots of the selected burst is not less than the number of slots that can be additionally allocated to pilot pattern B of the C-SM mode, the base station proceeds to step 738 where the base station restores the pilot patterns and the number of slots, which have been backed up, for every connection with the plurality of terminals.

Figure 8:
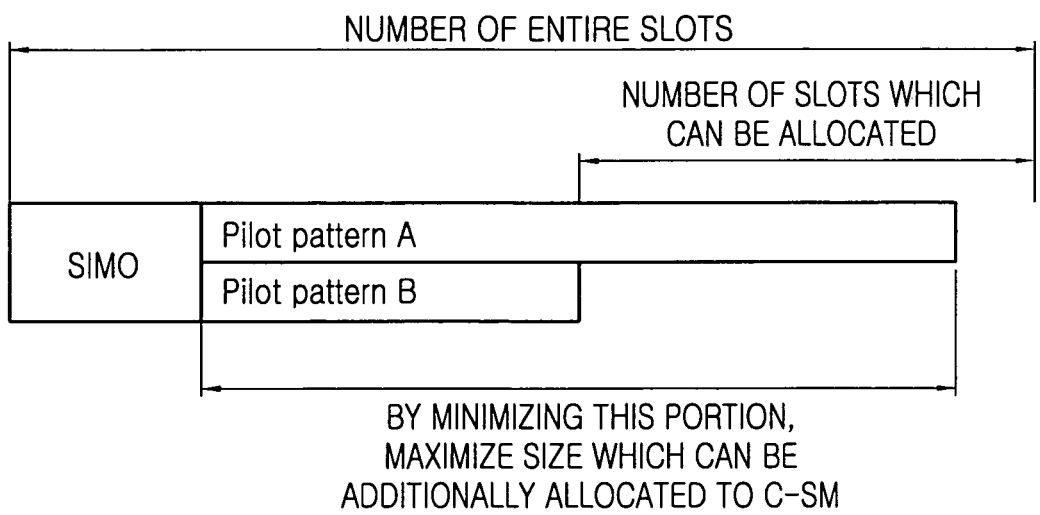
FIG. 8 is a view showing an example of an FF heuristic according to an exemplary embodiment of the present invention.

FIG. 8 is a view explaining the selection of pilot patterns based on an FF heuristic algorithm according to an exemplary embodiment of the present invention.

The FF heuristic algorithm is to maximize the number of slots that can be additionally allocated to the C-SM mode by maximizing the number of slots for pilot pattern A among all the slots.

Figure 9:
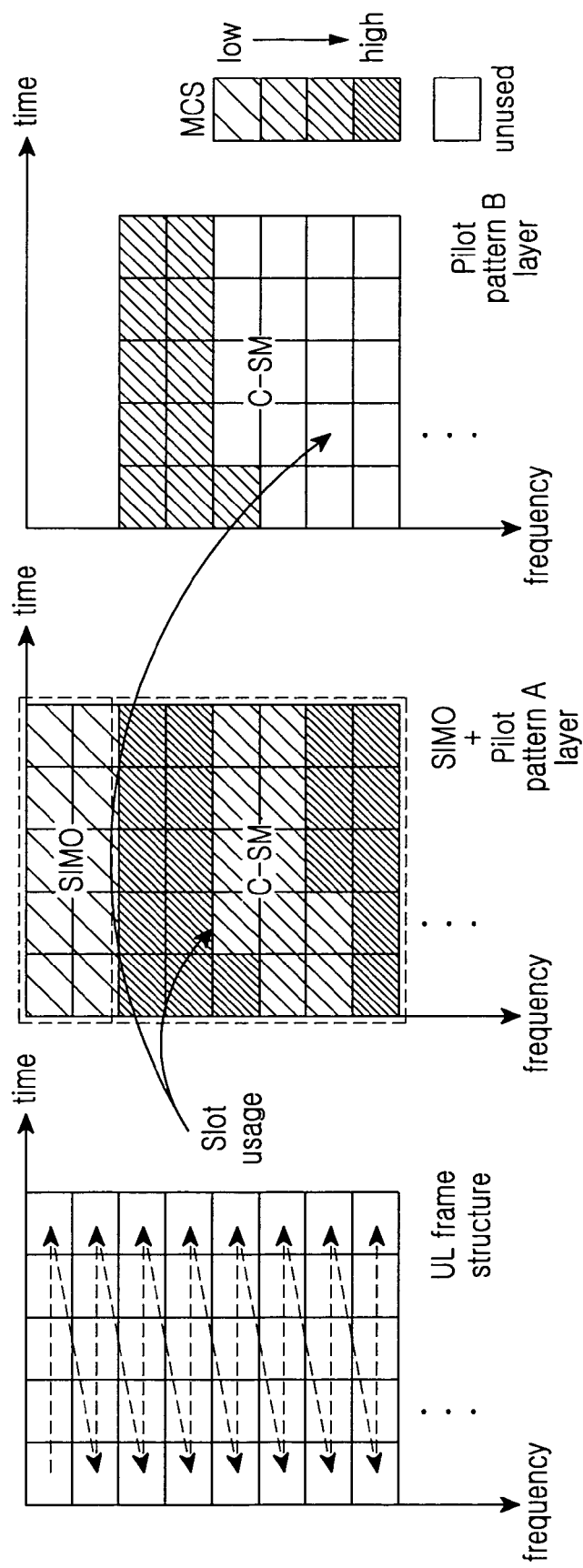
FIG. 9 is a view illustrating burst allocations based on pilot patterns according to an exemplary embodiment of the present invention.

FIG. 9 is a view illustrating burst allocations based on pilot patterns according to an exemplary embodiment of the present invention.

Bursts of the C-SM mode are allocated both pilot patterns A and B. Pilot patterns A and B are allocated together with the SIMO mode and the C-SM mode (wherein, bursts of the SIMO mode using pilot pattern B have not been shown).

Figure 10:
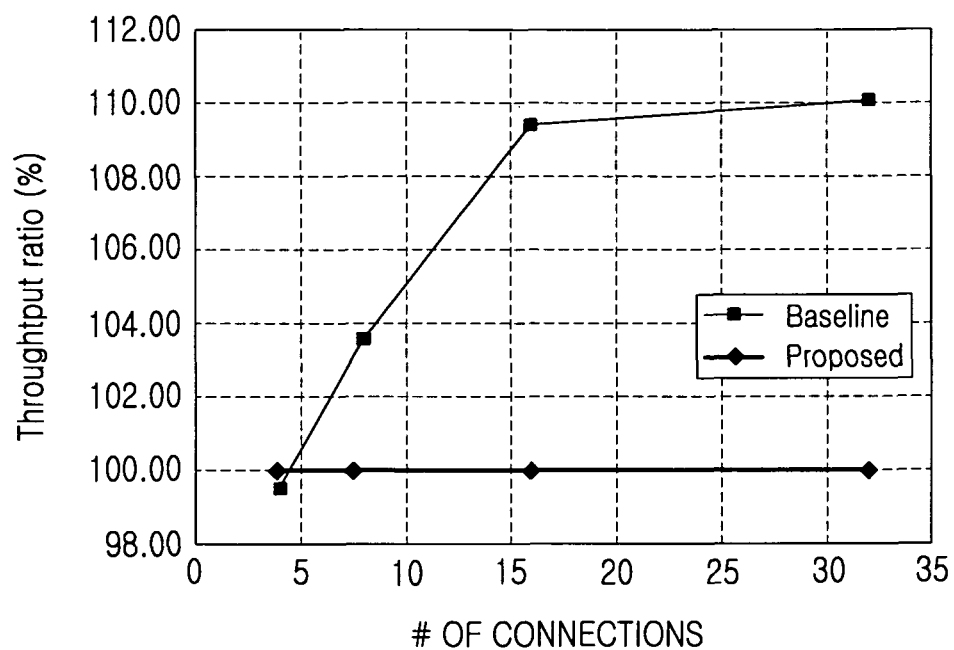
FIG. 10 is a view illustrating a result of a simulation of an uplink burst allocation algorithm according to an exemplary embodiment of the present invention.

FIG. 10 is a view illustrating a result of a simulation of an uplink burst allocation algorithm according to an exemplary embodiment of the present invention.

The simulation was performed with the following conditions:

The number of entire slots: 140
The number of SIMO mode slots: 40
C-SM mode bursts are arranged in order of size, e.g., in the sequence of 40, 30, 20, and 10.
WF heuristic
Pilot pattern A: 40, 20
Pilot pattern B: 30, 20, 10
FF heuristic As shown in FIG. 10, when a sufficient number of connections exist, the burst allocation algorithm according to the present invention can obtain a throughput gain of about 10%, as compared with the baseline.

According to the present invention, as described above, since a terminal located in a cell boundary is controlled to use the SIMO mode, it is possible to prevent coverage reduction and it is possible to minimize damage in the priority, so that unnecessary increases in delay can be prevented. In addition, according to the present invention, since bursts using the C-SM mode are properly disposed, it is possible to increase the probability that a newly selected burst will be additionally allocated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing, by a base station, an uplink scheduling in a spatial multiplexing system, the method comprising:
    determining one of a single-input multiple-output (SIMO) mode and a collaborative spatial multiplexing (C-SM) mode as an uplink transmission mode to be used by a mobile station, based on at least one of channel status information and an uplink transmission power of the mobile station;
    determining a transmission format of the base station, the transmission format corresponding to the determined uplink transmission mode from the SIMO mode and the C-SM mode;
    adjusting a disposition of previously allocated uplink bursts of the SIMO mode and the C-SM mode within a frame, for allocation of an uplink burst according to the determined uplink transmission mode;
    generating resource allocating information including mode information regarding the determined uplink transmission mode, format information regarding the determined transmission format, and position information regarding allocation of the uplink bursts according to the adjusted disposition; and
    transmitting the resource allocating information to the mobile station.

2. The method as claimed in claim 1, wherein adjusting the disposition of the previously allocated uplink bursts comprises:
    if the determined uplink transmission mode is the SIMO mode, backing up a SIMO pilot pattern, which is a pilot pattern for uplink bursts of the SIMO mode, C-SM pilot patterns, which are pilot patterns for uplink bursts of the C-SM mode, and a number of total slots allocated for the previously allocated uplink bursts of the SIMO mode and the C-SM mode, and releasing the total slots;
    resetting the C-SM pilot patterns, and recalculating a number of remaining slots;
    if uplink bursts for which a pilot pattern has not been determined remain, selecting an uplink burst to which most slots are allocated from among the remaining uplink bursts;
    if a pilot pattern for a mobile station corresponding to the selected uplink burst has not been determined, comparing a number of slots that are able to be additionally allocated to a first pilot pattern among the C-SM pilot patterns with a number of slots that are able to be additionally allocated to a second pilot pattern among the C-SM pilot patterns;
    determining a pilot pattern for the selected uplink burst according to a result of the comparison; and
    adjusting a disposition of the selected uplink burst in the frame based on the pilot pattern determined for the selected uplink burst.

3. The method as claimed in claim 2, wherein determining the pilot pattern for the selected uplink burst according to the result of the comparison comprises:
    performing a first comparison that compares a number of allocation slots of the selected uplink burst with the number of slots that are able to be additionally allocated to the first pilot pattern, and determining the pilot pattern for the selected uplink burst according to a result of the first comparison, if the number of slots that are able to be additionally allocated to the first pilot pattern is not less than the number of slots that are able to be additionally allocated to the second pilot pattern; and
    performing a second comparison that compares the number of allocation slots of the selected uplink burst with the number of slots that are able to be additionally allocated to the second pilot pattern, and determining the pilot pattern for the selected uplink burst according to a result of the second comparison, if the number of slots that are able to be additionally allocated to the first pilot pattern is less than the number of slots that are able to be additionally allocated to the second pilot pattern.

4. The method as claimed in claim 3, wherein determining the pilot pattern for the selected uplink burst according to the result of the first comparison comprises determining the pilot pattern for the selected uplink burst as the first pilot pattern, if the number of allocation slots of the selected uplink burst is less than the number of slots that are able to be additionally allocated to the first pilot pattern.

5. The method as claimed in claim 3, wherein determining the pilot pattern for the selected uplink burst according to the result of the first comparison comprises restoring the backed-up number of slots and the backed-up pilot patterns, if the number of allocation slots of the selected uplink burst is not less than the number of slots that are able to be additionally allocated to the first pilot pattern.

6. The method as claimed in claim 3, wherein determining the pilot pattern for the selected uplink burst according to the result of the second comparison comprises determining the pilot pattern for the selected uplink burst as the second pilot pattern, if the number of allocation slots of the selected uplink burst is less than the number of slots that are able to be additionally allocated to the second pilot pattern.

7. The method as claimed in claim 3, wherein determining the pilot pattern for the selected uplink burst according to the result of the second comparison comprises restoring the backed-up number of slots and the backed-up pilot patterns, if the number of allocation slots of the selected uplink burst is not less than the number of slots that are able to be additionally allocated to the second pilot pattern.

8. The method as claimed in claim 2, further comprising:
if the pilot pattern for the mobile station corresponding to the selected uplink burst has been determined, comparing a number of allocation slots of the selected uplink burst with a number of remaining slots of the pilot pattern determined for the mobile station;
if the number of allocation slots of the selected uplink burst is less than the number of remaining slots of the determined pilot pattern, adjusting disposition of the selected uplink burst in the frame based on the pilot pattern determined for the mobile station; and
if the number of allocation slots of the selected uplink burst is not less than the number of remaining slots of the determined pilot pattern, restoring the backed-up number of slots and the backed-up pilot patterns.

9. The method as claimed in claim 1, wherein adjusting the disposition of the previously allocated uplink bursts comprises:
if the determined uplink transmission mode is the C-SM mode, backing up a SIMO pilot pattern, which is a pilot pattern for uplink bursts of the SIMO mode, C-SM pilot patterns, and a number of total slots allocated for the previously allocated uplink bursts of the SIMO mode and the C-SM mode, and releasing the total slots;
resetting the C-SM pilot patterns, and recalculating a number of remaining slots;
if uplink bursts for which a pilot pattern has not been determined remain, selecting an uplink burst to which most slots are allocated from among the remaining uplink bursts;
if a pilot pattern for a mobile station corresponding to the selected uplink burst has not been determined, checking if there is an uplink burst allocated to the mobile station;
if there is not the uplink burst allocated to the mobile station, performing a first comparison that compares a number of allocation slots of the selected uplink burst with a number of slots that are able to be additionally allocated to a first pilot pattern among the C-SM pilot patterns;
determining a pilot pattern for the selected uplink burst according to a result of the first comparison; and
adjusting a disposition of the selected uplink burst in the frame based on the pilot pattern determined for the selected uplink burst.

10. The method as claimed in claim 9, wherein determining the pilot pattern for the selected uplink burst according to the result of the first comparison comprises:
determining the pilot pattern for the selected uplink burst as the first pilot pattern, if the number of allocation slots of the selected uplink burst is less than the number of slots that are able to be additionally allocated to the first pilot pattern; and
in a second comparison, comparing the number of allocation slots of the selected uplink burst with the number of slots that are able to be additionally allocated to the second pilot pattern, and determining the pilot pattern for the selected uplink burst according to a result of the second comparison, if the number of allocation slots of the selected uplink burst is not less than the number of slots that are able to be additionally allocated to the first pilot pattern.

11. The method as claimed in claim 10, wherein determining the pilot pattern for the selected uplink burst according to the result of the second comparison comprises:
determining the pilot pattern for the selected uplink burst as the second pilot pattern, if the number of allocation slots of the selected uplink burst is less than the number of slots that are able to be additionally allocated to the second pilot pattern.

12. The method as claimed in claim 10, wherein determining the pilot pattern for the selected uplink burst according to the result of the second comparison comprises
restoring the backed-up number of slots and the backed-up pilot patterns, if the number of allocation slots of the selected uplink burst is not less than the number of slots that are able to be additionally allocated to the second pilot pattern.

13. The method as claimed in claim 9, further comprising:
if the pilot pattern for the mobile station corresponding to the selected uplink burst has been determined, comparing the number of allocation slots of the selected uplink burst with a number of remaining slots of the pilot pattern determined for the mobile station;
if the number of allocation slots of the selected uplink burst is less than the number of remaining slots of the determined pilot pattern, adjusting the disposition of the selected uplink burst in the frame based on the pilot pattern determined for the mobile station; and
if the number of allocation slots of the selected uplink burst is not less than the number of remaining slots of the determined pilot pattern, restoring the backed-up number of slots and the backed-up pilot pattern.

14. A base station comprising:
an uplink scheduler configured to:
determine one of a single-input multiple-output (SIMO) mode and a collaborative spatial multiplexing (C-SM) mode as an uplink transmission mode to be used by a mobile station, based on at least one of channel status information and an uplink transmission power of the mobile station;
determine a transmission format of the base station, the transmission format corresponding to the determined uplink transmission mode from the SIMO mode and the C-SM mode;
adjust a disposition of previously allocated uplink bursts of the SIMO mode and the C-SM mode in a frame, for allocation of an uplink burst according to the determined uplink transmission mode;
a controller configured to generate resource allocating information including mode information regarding the determined uplink transmission mode, format information regarding the determined transmission format, and position information regarding allocation of the uplink burst according to the adjusted disposition; and
a transmitter configured to transmit the resource allocating information to the mobile station.

15. The base station as claimed in claim 14, wherein, in changing the disposition of the previously allocated uplink bursts, the uplink scheduler is further configured to:
if the determined uplink transmission mode is the SIMO mode, back up a SIMO pilot pattern, which is a pilot pattern for uplink bursts of the SIMO mode, C-SM pilot patterns, which are pilot patterns for uplink bursts of the C-SM mode, and a number of total slots allocated for the previously allocated uplink bursts of the SIMO mode and the C-SM mode, and release the total slots;
reset the C-SM pilot patterns, and recalculate a number of remaining slots;

if uplink bursts for which a pilot pattern has not been determined remain, select an uplink burst to which most slots are allocated from among the remaining uplink bursts;

if a pilot pattern for a mobile station corresponding to the selected uplink burst has not been determined, compare a number of slots that are able to be additionally allocated to a pilot pattern among the C-SM pilot patterns with a number of slots that are able to be additionally allocated to a second pilot pattern among the C-SM pilot patterns;

determine a pilot pattern for the selected uplink burst according to a result of the comparison; and adjust a disposition of the selected uplink burst in the frame based on the pilot pattern determined for the selected uplink burst.

16. The base station as claimed in claim 15, wherein in determining the pilot pattern for the selected uplink burst according to the result of the comparison, the uplink scheduler is further configured to:

perform a first comparison that compares a number of allocation slots of the selected uplink burst with the number of slots that are able to be additionally allocated to the first pilot pattern, and determine the pilot pattern for the selected uplink burst according to a result of the first comparison, if the number of slots that are able to be additionally allocated to the first pilot pattern is not less than the number of slots that are able to be additionally allocated to the second pilot pattern; and perform a second comparison that compares the number of allocation slots of the selected uplink burst with the number of slots that are able to be additionally allocated to the second pilot pattern, and determine the pilot pattern for the selected uplink burst according to a result of the second comparison, if the number of slots that are able to be additionally allocated to the first pilot pattern is less than the number of slots that can are able to be additionally allocated to the second pilot pattern.

17. The base station as claimed in claim 16, wherein, in determining the pilot pattern for the selected uplink burst according to the result of the first comparison the uplink scheduler is further configured to determine the pilot pattern for the selected uplink burst as the first pilot pattern, if the number of allocation slots of the selected uplink burst is less than the number of slots that are able to be additionally allocated to the first pilot pattern.

18. The base station as claimed in claim 16, wherein, in determining the pilot pattern for the selected uplink burst according to the result of the first comparison, the uplink scheduler is further configured to restore the backed-up number of slots and the backed-up pilot patterns, if the number of allocation slots of the selected uplink burst is not less than the number of slots that are able to be additionally allocated to the first pilot pattern.

19. The base station as claimed in claim 16, wherein, in determining the pilot pattern for the selected uplink burst according to the result of the second comparison, the uplink scheduler is further configured to determine a pilot pattern for the selected uplink burst to be the second pilot pattern, if the number of allocation slots of the selected uplink burst is less than the number of slots that are able to be additionally allocated to the second pilot pattern.

20. The base station as claimed in claim 16, wherein, in determining the pilot pattern for the selected uplink burst according to the result of the second comparison, the uplink scheduler is further configured to restore the backed-up number of slots and the backed-up pilot patterns, if the number of allocation slots of the selected uplink burst is not less than the number of slots that are able to be additionally allocated to the second pilot pattern.

21. The base station as claimed in claim 15, the uplink scheduler is further configured to:

if the pilot pattern for the mobile station corresponding to the selected uplink burst has been determined, compare a number of allocation slots of the selected uplink burst with a number of remaining slots of the pilot pattern determined for the mobile station;

if the number of allocation slots of the selected uplink burst is less than the number of remaining slots of the determined pilot pattern, adjust a disposition of the selected uplink burst in the frame based on the pilot pattern determined for the mobile station; and if the number of allocation slots of the selected uplink burst is not less than the number of remaining slots of the determined pilot pattern, restore the backed-up number of slots and the backed-up pilot patterns.

22. The base station as claimed in claim 14, wherein, in adjusting the disposition of the previously allocated uplink bursts, the uplink scheduler is further configured to:

if the determined uplink transmission mode is the C-SM mode, back up a SIMO pilot pattern, which is a pilot pattern for uplink bursts of the SIMO mode, C-SM pilot patterns, and a number of total slots allocated for the previously allocated uplink bursts of the SIMO mode and the C-SM mode, and release the total slots;

reset the C-SM pilot patterns, and recalculate a number of remaining slots;

if uplink bursts for which a pilot pattern has not been determined remain, select a uplink burst to which most slots are allocated from among the remaining uplink bursts;

if a pilot pattern for a mobile station corresponding to the selected uplink burst has not been determined, check if there is a uplink burst allocated to the mobile station;

if there is not the uplink burst allocated to the mobile station, perform a first comparison that compares a number of allocation slots of the selected uplink burst with a number of slots that are able to be additionally allocated to a first pilot pattern among the C-SM pilot patterns;

determine a pilot pattern for the selected uplink burst according to a result of the first comparison; and adjust a disposition of the selected uplink burst in the frame based on the pilot pattern determined for the selected uplink burst.

23. The base station as claimed in claim 22, wherein, in determining the pilot pattern for the selected uplink burst according to the result of the first comparison, the uplink scheduler is further configured to:

determine the pilot pattern for the selected uplink burst as the first pilot pattern, if the number of allocation slots of the selected uplink burst is less than the number of slots that are able to be additionally allocated to the first pilot pattern; and perform a second comparison that compares the number of allocation slots of the selected uplink burst with the number of slots that are able to be additionally allocated to the second pilot pattern, and determine the pilot pattern for the selected uplink burst according to a result of the second comparison, if the number of allocation slots of the selected uplink burst is not less than the number of slots that are able to be additionally allocated to the first pilot pattern.

24. The base station as claimed in claim 23, wherein, in determining the pilot pattern for the selected uplink burst according to the result of the second comparison, the uplink scheduler is further configured to determine the pilot pattern for the selected uplink burst as the second pilot pattern, if the number of allocation slots of the selected uplink burst is less than the number of slots that are able to be additionally allocated to the pilot pattern B.

25. The base station as claimed in claim 23, wherein, in determining the pilot pattern for the selected uplink burst according to the result of the second comparison, the uplink scheduler is further configured to restore the backed-up number of slots and the backed-up pilot patterns, if the number of allocation slots of the selected uplink burst is not less than the number of slots that are able to be additionally allocated to the pilot pattern B.

26. The base station as claimed in claim 22, the uplink scheduler is further configured to:
   if the pilot pattern for the mobile station corresponding to the selected uplink burst has been determined, compare the number of allocation slots of the selected uplink burst with a number of remaining slots of the pilot pattern determined for the mobile station;
   if the number of allocation slots of the selected uplink burst is less than the number of remaining slots of the determined pilot pattern, adjust the disposition of the selected uplink burst in the frame based on the pilot pattern determined for the mobile station; and
   if the number of allocation slots of the selected uplink burst is not less than the number of remaining slots of the determined pilot pattern, restore the backed-up number of slots and the backed-up pilot patterns.

27. The method as claimed in claim 1, wherein adjusting the disposition of the previously allocated uplink bursts comprises:
   if the determined uplink transmission mode is the SIMO mode, evenly dividing and allocating the previously allocated uplink bursts of the C-SM mode to a first layer using a first pilot pattern and a second layer using a second pilot pattern; and
   if the determined uplink transmission mode is the C-SM mode, allocating the previously allocated uplink bursts of the C-SM mode to one of the first layer and the second layer.

28. The base station as claimed in claim 14, wherein uplink scheduler is further configured to:
   if the determined uplink transmission mode is the SIMO mode, evenly divide and allocate the previously allocated uplink bursts of the C-SM mode to a first layer using a first pilot pattern and a second layer using a second pilot pattern; and
   if the determined uplink transmission mode is the C-SM mode, allocate the previously allocated uplink bursts of the C-SM mode to one of the first layer and the second layer.

29. The method as claimed in claim 1, wherein if a transmission format of the base station corresponding to one of the SIMO mode and the C-SM mode is determined based on the determined uplink transmission mode, the resource allocating information further comprises information regarding the determined transmission format.

30. The base station as claimed in claim 14, wherein if a transmission format of the base station corresponding to one of the SIMO mode and the C-SM mode is determined by the uplink scheduler based on the determined uplink transmission mode, the resource allocating information further comprises info nation regarding the determined transmission format.

* * * * *